(12) United States Patent
Lee et al.

(10) Patent No.: US 9,583,226 B2
(45) Date of Patent: Feb. 28, 2017

(54) COOLING DUCT ASSEMBLY FOR CONTROL ELEMENT DRIVE MECHANISM

(71) Applicant: KEPCO ENGINEERING & CONSTRUCTION COMPANY, INC., Gyeonggi-do (KR)

(72) Inventors: Myoung Goo Lee, Daejeon (KR); Woo Cheol Choi, Daejeon (KR); Yeon Ho Cho, Daejeon (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 471 days.

(21) Appl. No.: 14/322,811

(22) Filed: Jul. 2, 2014

(65) Prior Publication Data

US 2015/0016582 A1 Jan. 15, 2015

(30) Foreign Application Priority Data

Jul. 2, 2013 (KR) .......................... 10-2013-0077289

(51) Int. Cl.
*G21C 19/28* (2006.01)
*G21C 19/19* (2006.01)
*G21C 7/10* (2006.01)

(52) U.S. Cl.
CPC ............... *G21C 19/19* (2013.01); *G21C 7/10* (2013.01); *Y02E 30/39* (2013.01)

(58) Field of Classification Search
CPC ........ G21C 1/02; G21C 13/073; G21C 15/18; G21C 1/32; G21C 1/322; G21C 3/02;

(Continued)

(56) References Cited

U.S. PATENT DOCUMENTS 3,691,011 A * 9/1972 Kruger ................... G21C 19/00
                                                           376/271
4,288,290 A * 9/1981 Saima .................... G21C 19/02
                                                           376/245

(Continued)

FOREIGN PATENT DOCUMENTS

| KR | 10-0289790 B1 | 2/2001 |
| KR | 20-0432810 Y1 | 12/2006 |
| KR | 1020070011172 A | 1/2007 |

OTHER PUBLICATIONS

Notice of Allowance issued in co-pending Korean Application No. 10-2013-0077289, dated Apr. 4, 2015, 6 pages.

(Continued)

*Primary Examiner* — Jack W Keith
*Assistant Examiner* — Fredrick Michael
(74) *Attorney, Agent, or Firm* — Nixon Peabody LLP; Khaled Shami (57) ABSTRACT

The cooling duct assembly for a control element drive mechanism (CEDM) includes a skirt that is combined on a circumference of a reactor head and has first air channels in an inner side thereof; a lower duct that is combined with an upper side of the skirt, has second air channels that are connected to the first air channels, and is disposed to surround a circumference of the CEDM; and an upper duct, an edge of which is combined with the cooling air handling device, and other edge of which is detachably combined with the lower duct, wherein air that cools the CEDM is discharged to the outside after sequentially passing the first air channels, the second air channels, the upper duct, and the cooling air handling device, and the upper duct separated from the lower duct is lifted together with the cooling air handling device.

5 Claims, 9 Drawing Sheets

(58) Field of Classification Search
CPC . G21C 5/00; G21C 7/04; G21C 7/103; G21C 1/12; G21C 13/02; G21C 15/02; G21C 15/04; G21C 7/12; G21C 13/00; G21C 19/00; G21C 1/03; G21C 1/08; G21C 1/084; G21C 1/14; G21C 1/16; G21C 1/326; G21C 3/041; G21C 3/08; G21C 3/18; G21C 3/30; G21C 3/36; G21C 3/60; G21C 5/08; G21C 5/12; G21C 5/16; G21C 7/16; G21C 7/26; G21C 7/36; G21C 9/001
USPC ....... 376/312, 318, 325, 349, 350, 352, 368, 376/391, 432, 171, 205, 213, 239, 243, 376/248, 253, 255, 267, 268, 273, 277, 376/286, 295, 296, 300, 319, 322, 324, 376/353, 356, 381, 385, 395, 399, 401, 376/403, 404, 405, 419, 427, 447, 157, 376/159, 174, 194, 206, 210, 218, 223, 376/231, 460, 463, 900, 901, 905, 913; 126/77, 110 B, 113, 290, 163 R, 61, 126/110 R, 299 D, 530, 549, 116 B, 126/116 R, 21 A, 21 R, 245, 285 A, 126/285 R, 287.5, 517, 531, 535, 547, 56, 126/572, 101, 110 A, 110 AA, 110 C, 126/110 D, 112, 114, 116 A, 155, 163 A, 126/176 R, 182, 19 R, 191, 200, 273 A, 126/273 R, 289

See application file for complete search history.

(56) References Cited

U.S. PATENT DOCUMENTS

| | | | |
|---|---|---|---|
| 4,511,531 A * | 4/1985 | Swidwa | G21C 19/02 294/906 |
| 2004/0101084 A1* | 5/2004 | Baliga | G21C 13/073 376/261 |
| 2005/0084057 A1* | 4/2005 | Harkness | G21C 13/073 376/263 |
| 2007/0140402 A1* | 6/2007 | Baliga | G21C 13/02 376/203 |
| 2010/0098205 A1* | 4/2010 | Kang | G21C 7/14 376/263 |
| 2011/0298307 A1* | 12/2011 | Lee | G21C 7/10 310/12.04 |

OTHER PUBLICATIONS

Office Action in Korean Application No. 10-2013-0077289 dated Aug. 1, 2014.
Lee, M et al., "Simplification of the OPR1000 Reactor Head Area Structure," KPVP 2012 Yearly Symposium, Nov. 22, 2012~Nov. 23, 2012.

* cited by examiner

COOLING DUCT ASSEMBLY FOR CONTROL ELEMENT DRIVE MECHANISM

CROSS-REFERENCE TO RELATED PATENT APPLICATION

This application claims the benefit of Korean Patent Application No. 10-2013-0077289, filed on Jul. 2, 2013, in the Korean Intellectual Property Office, the disclosure of which is incorporated herein in its entirety by reference.

BACKGROUND OF THE INVENTION

1. Field of the Invention

The present invention relates to a cooling duct assembly for a control element drive mechanism, and more particularly, to a cooling duct assembly for a control element drive mechanism (CEDM), in which an upper assembly of a nuclear reactor is conveniently disassembled, moved, and stored by improving structures of a duct which is provided for cooling the CEDM that constitutes the upper assembly of the nuclear reactor.

2. Description of the Related Art

Figure 1:
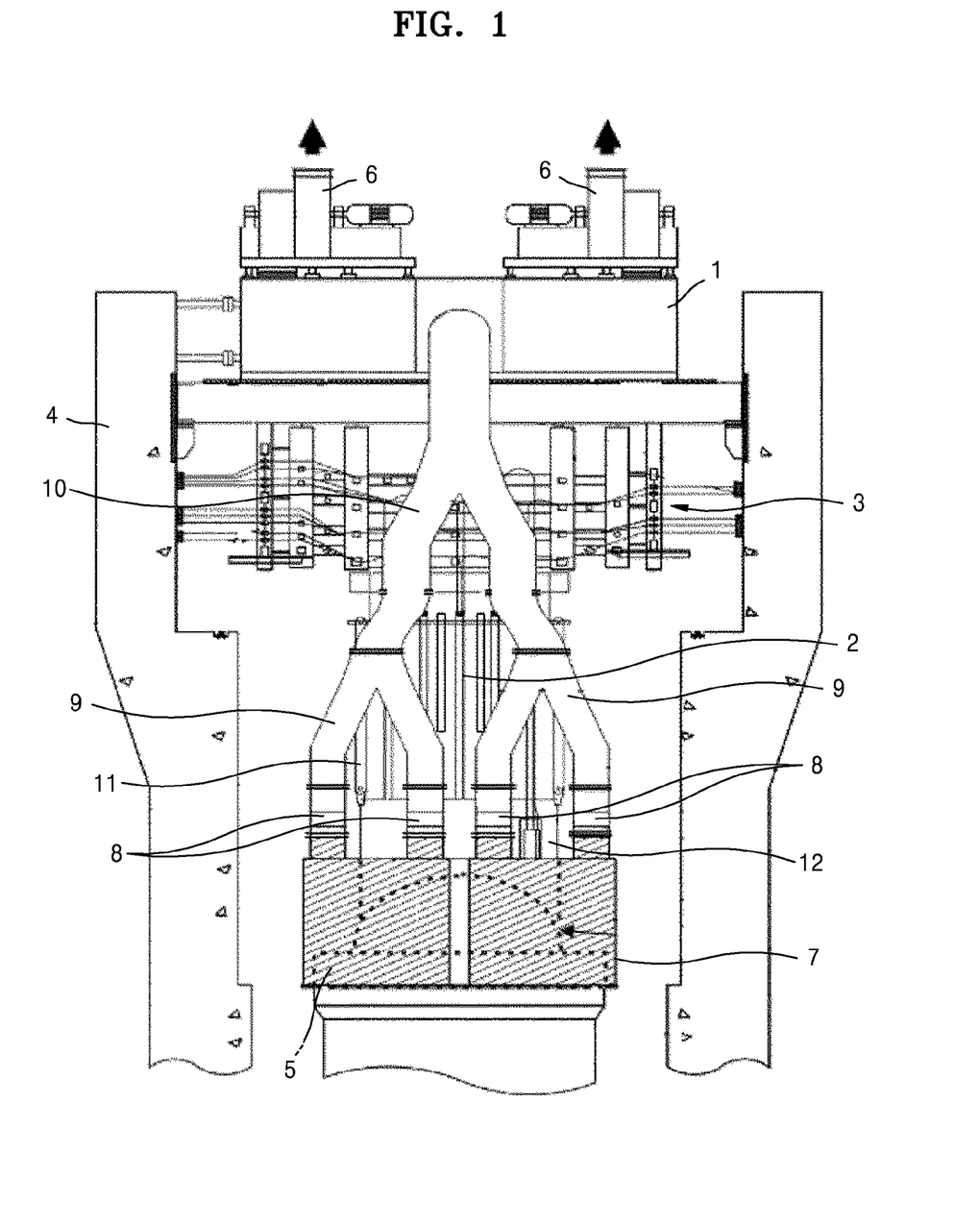
FIG. 1 is a schematic lateral view of an upper assembly of a related nuclear reactor.

FIG. 1 is a schematic lateral view of an upper assembly of a related nuclear reactor. Referring to FIG. 1, the upper assembly includes a head lift rig 11, a duct, a head area cable tray system (HACTS) 3, and a control element drive mechanism air handling unit (CEDM AHU) 1.

The CEDM AHU 1 circulates cooling air during an operation of a power generator to cool a CEDM 2, and is supported by a shielding wall 4 together with the HACTS 3. The head lift rig 11 is a device for lifting a reactor head 5 for fuel change after stopping the power generator and is installed above the reactor head 5.

The CEDM AHU 1 includes a plurality of cooling fans 6. When the cooling fans 6 operate, surrounding air flows into the CEDM 2. The cooling air flows downwardly between coil assemblies to cool down them, and reaches manifolds 7 after flowing through a nozzle unit of the reactor head 5 and a plurality of holes of a skirt 12.

Afterwards, the cooling air sequentially passes through the manifolds 7 and ducts 8, 9, and 10, and is re-discharged into surrounding flow spaces from the CEDM AHU 1 through the cooling fans 6. There are four manifolds 7, and each manifold 7 includes two branch ducts 8, and thus, eight branch ducts 8 are disposed on the four manifolds 7. The eight branch ducts 8 are combined to four connection ducts 9, and the four connection ducts 9 are combined to two upper ducts 10, and finally, the two upper ducts 10 are connected to the CEDM AHU 1. FIG. 1 shows only a side of the related nuclear reactor, and the nuclear reactor of FIG. 1 has the other symmetrically formed side.

In the upper assembly of the related nuclear reactor, the reactor head 5 needs to be lifted on every fuel change, and at this time, the branch ducts 8, the connection ducts 9, the upper ducts 10, the CEDM AHU 1, and the HACTS 3 must be disassembled and moved to a temporary storage.

More specifically, the CEDM AHU 1 and the HACTS 3 are lifted and moved to a temporary storage. Next, the branch ducts 8, the connection ducts 9, the upper ducts 10, and the manifolds 7 are disassembled, lifted, and moved to a temporary storage separately. The disassembling of the branch ducts 8, the connection ducts 9, the upper ducts 10, and the manifolds 7 requires a lot of time since a plurality of bolts and nuts must be released. Also, the upper region of the related nuclear reactor is a radiation region, and is an elevated place where the branch ducts 8, the connection ducts 9, and the upper ducts 10 are connected, and thus, appropriate measures are needed for workers' safety. Also, when assembling work is performed after refueling is finished, the workload is the same as in the disassembling case and the same safety measures are needed.

SUMMARY OF THE INVENTION

The present invention provides a cooling duct assembly for a control element drive mechanism, in which an upper assembly of a nuclear reactor is conveniently disassembled, moved, and stored due to improved structures of ducts which are provided for cooling the control element drive mechanism that constitutes the upper assembly of the nuclear reactor and when the disassembled upper assembly of the nuclear reactor is stored in a temporary storage, interferences between surrounding facilities are avoided due to improved structures of ducts.

According to an aspect of the present invention, there is provided a cooling duct assembly for a control element drive mechanism that is installed on an upper assembly of the nuclear reactor that comprises a control element drive mechanism that is disposed above a reactor head; a cable tray disposed above the control element drive mechanism, and a cooling air handling device that is disposed above the cable tray, the cooling duct assembly comprising: a skirt that is combined on a circumference of the reactor head and has first air channels in an inner side thereof; a lower duct that is combined with an upper side of the skirt, has second air channels connected to the first air channels, and is disposed to surround a circumference of the control element drive mechanism; and an upper duct, an edge of which is combined with the cooling air handling device, and other edge of which is detachably combined with the lower duct, wherein air that cools the control element drive mechanism is discharged to the outside after sequentially passing through the first air channels of the skirt, the second air channels of the lower duct, the upper duct, and the cooling air handling device, and the upper duct separated from the lower duct is lifted together with the cooling air handling device.

Preferably the cooling duct assembly may include a lifting rig that moves the upper duct up and down, wherein the edge of the upper duct is detachably combined with the cooling air handling device.

Preferably the lifting rig may include: guide rails that extend in upper and lower directions of the upper duct and are combined with an outer circumference of the upper duct; guiding blocks that support the guide rails by being attached to the cable tray or the cooling air handling device; wire having edge fixed on a lower edge of the upper duct; a winch that lifts and descends the upper duct by winding or unwinding the wire; and pulley that is disposed between the edge of the wire and the winch to guide the wire.

Preferably the winch may include: a reducer that controls a rotation speed of a driving axis; a motor that rotates the driving axis; and a brake that stops the motor from rotating.

Preferably the cable tray or the cooling air handling device may further include; fixing plate that is combined with the guiding blocks, and the pulley is rotatably combined with supporting bracket that is combined with the fixing plate.

Preferably the lower duct may include a plurality of sub-lower ducts having flow spaces for inducing air around the reactor head towards the control element drive mechanism, wherein the sub-lower ducts are separated from each other.

Preferably the sub-lower ducts may include a first sub-lower duct having a flow space for inducing the air around the reactor head towards the control element drive mechanism and a second sub-lower duct having flow spaces for inducing the air around the reactor head towards the control element drive mechanism.

In the cooling duct assembly for a control element drive mechanism (CEDM) according to the present invention, when a reactor is refueled, unlike the existing system, it is unnecessary to disassemble all ducts into many pieces. Therefore, the workload and time for disassembling, moving, and storing all elements of the upper assembly of the reactor may be reduced, thereby increasing work efficiency. Also, the safety of workers who work in a high radiation exposure region may be ensured by reducing the exposure.

Also, the processes of disassembling, moving, and storing the cooling duct assembly for a control element drive mechanism may be reduced, and thus, an overall preventive maintenance time and refueling time of the nuclear reactor may be reduced, thereby increasing the economy of the nuclear reactor.

Also, in the related art, when a reactor is refueled, there are no enough spaces to store the duct assembly that is disassembled into many pieces. The pieces of the duct assembly are placed on platforms of other structures or facilities, and thus, occupy much space. However, according to the current invention, the duct assembly is not disassembled into many pieces. Accordingly, it is unnecessary to secure storing spaces for duct parts, and thus, the availability of spaces in the nuclear reactor containment building may increase.

Also, in the related art, in order to lift the upper assembly of the nuclear reactor, an overhead polar crane is generally used. The overhead polar crane is used not only for disassembling, lifting, and moving the ducts, but also for lifting, moving, and installing other heavy structures in the containment building. Accordingly, when the overhead polar crane is used for disassembling, moving, and storing the ducts, other works cannot be performed, thereby reducing the work efficiency.

However, according to the current invention, no overhead polar crane is used for lifting the ducts since the cooling duct assembly according to the current invention includes an additional lifting rig for lifting the upper ducts. Also, the lower duct may be lifted as one body together with a reactor head without disassembling the lower duct. Therefore, use of an overhead polar crane is reduced, thereby increasing the overall work efficiency.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereafter, the present invention will be described more fully with reference to the accompanying drawings, in which exemplary embodiments of the present invention are shown. The terminology used herein is for the purpose of describing particular embodiments only and is not intended to be limiting of example embodiments. As used herein, the singular forms "a," "an" and "the" are intended to include the plural forms as well, unless the context clearly indicates otherwise.

Figure 2:
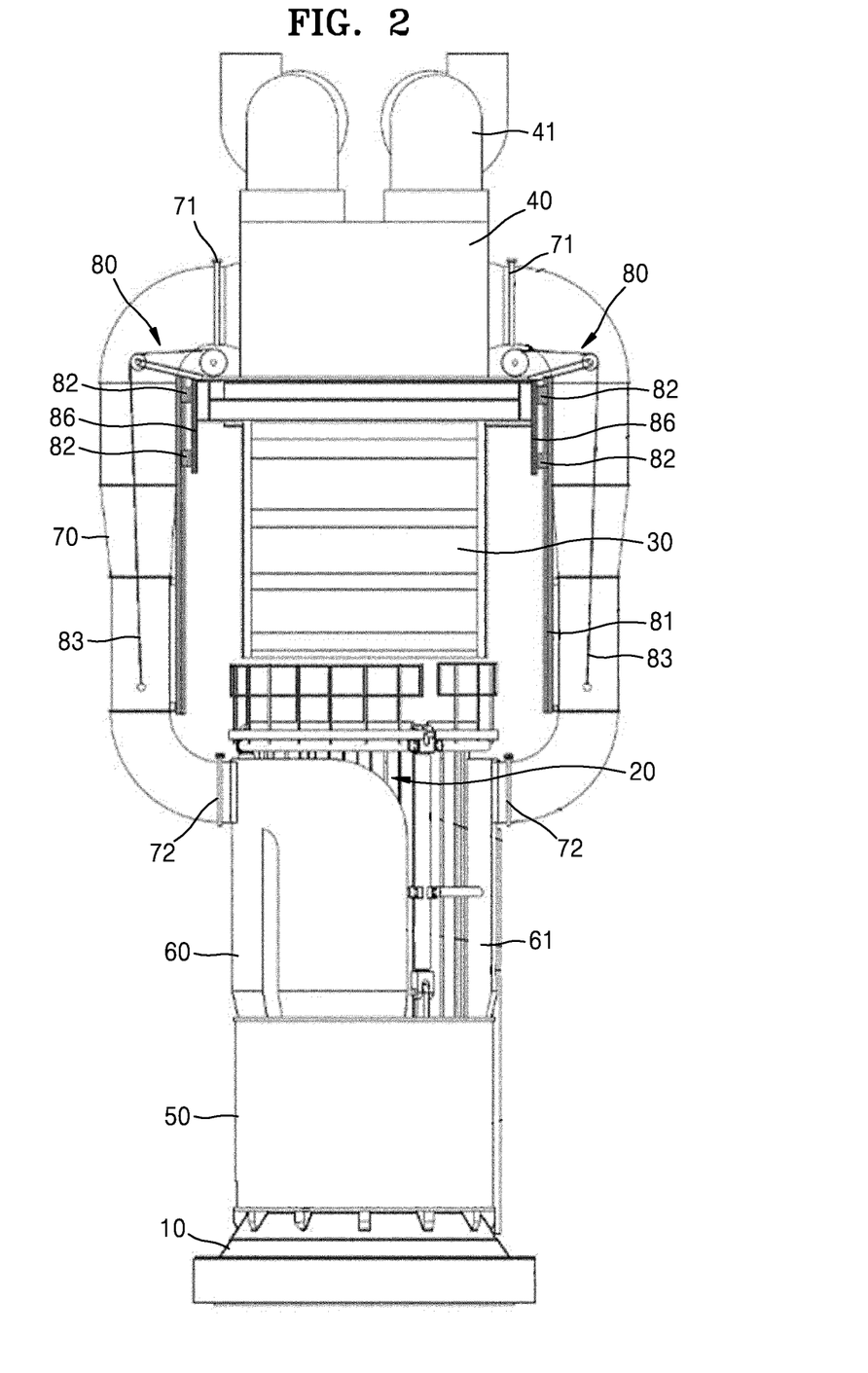
FIG. 2 is a schematic conceptual drawing of an upper assembly of a nuclear reactor that employs a cooling duct assembly for a control element drive mechanism, according to an embodiment of the present invention.
Figure 3:
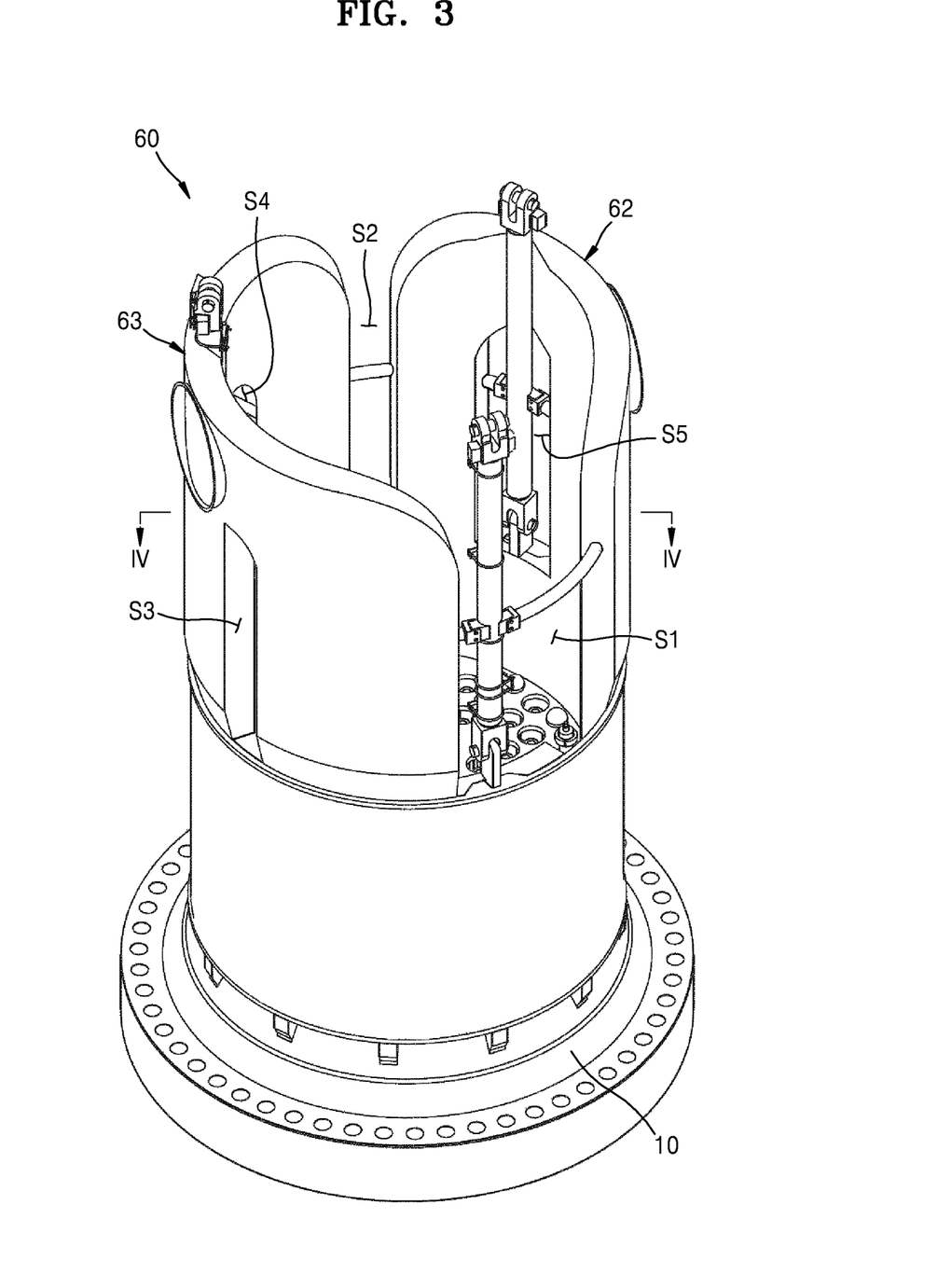
FIG. 3 is an extracted perspective view of a key portion of the upper assembly of FIG. 2.
Figure 4:
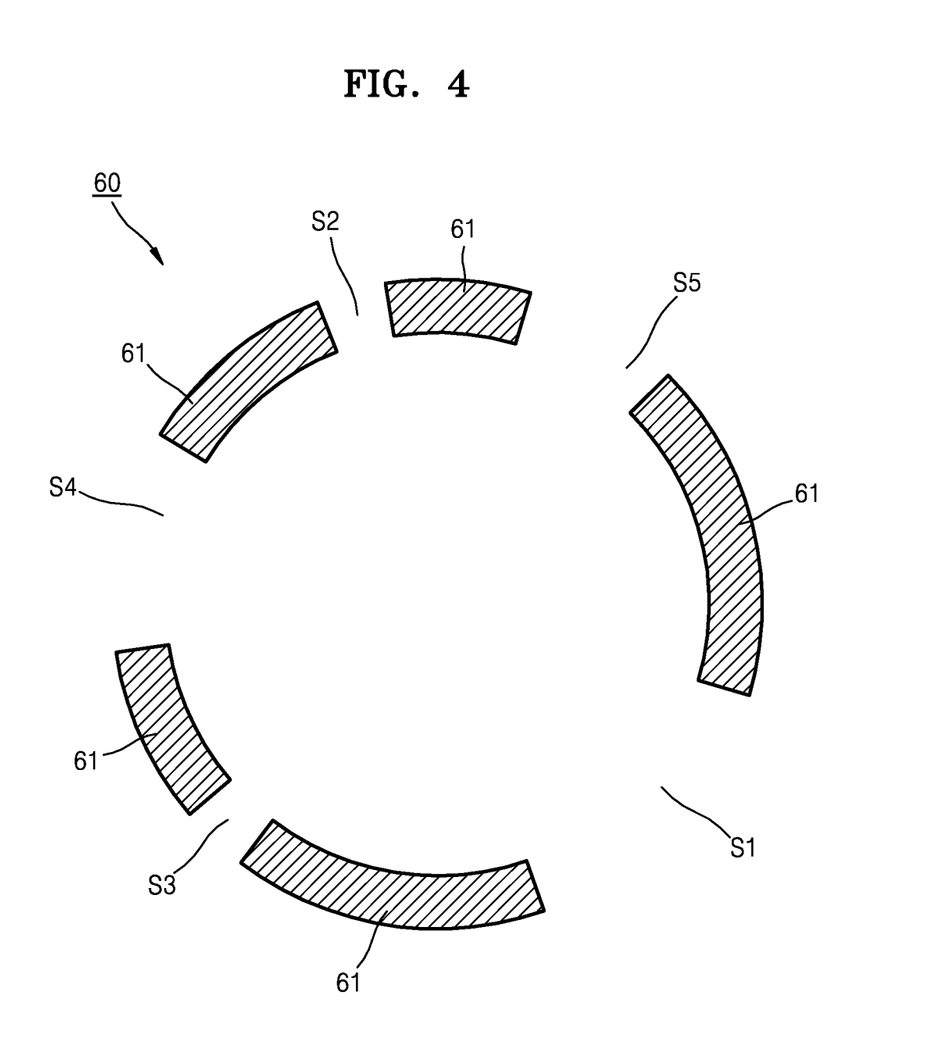
FIGS. 4 and 5 are cross-sectional views of the key portion of FIG. 3.
Figure 5:
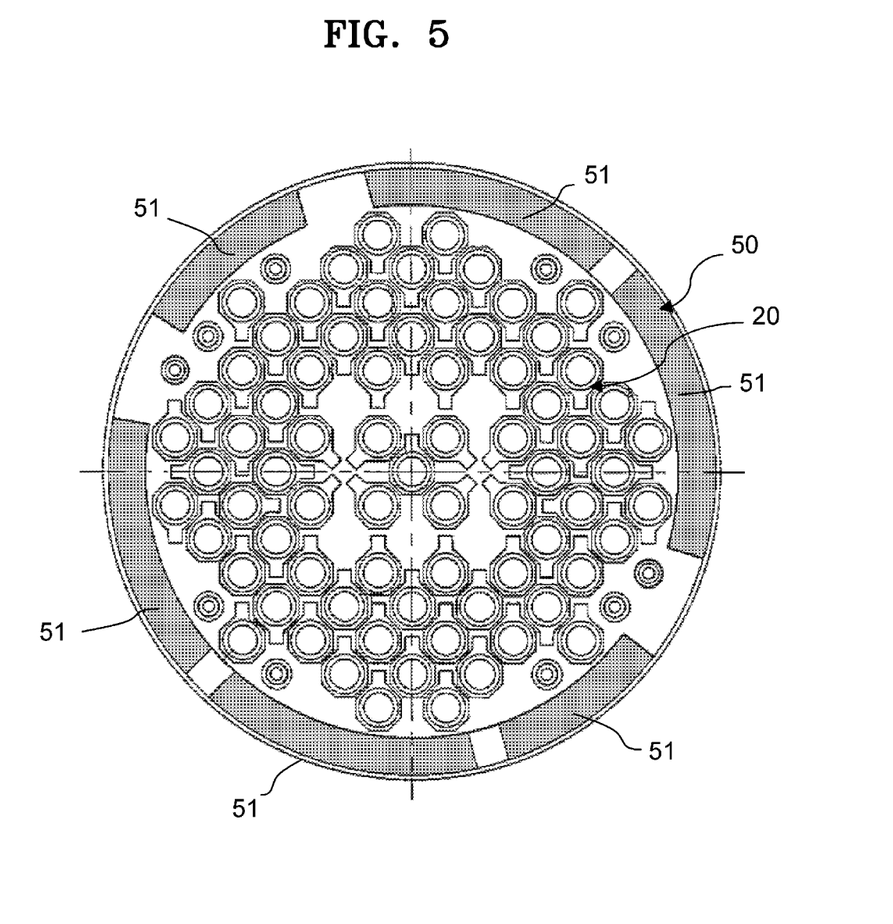
Figure 6:
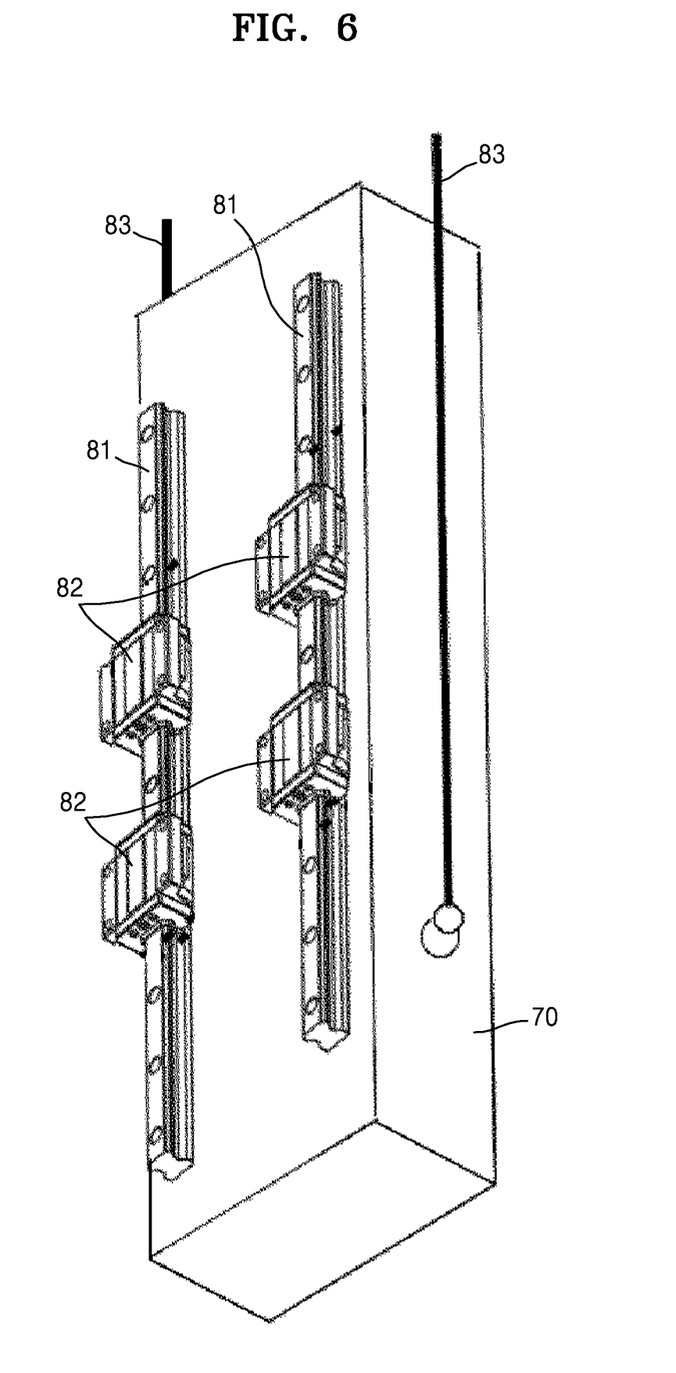
FIG. 6 is an extracted perspective view of the key portion of FIG. 2.
Figure 7:
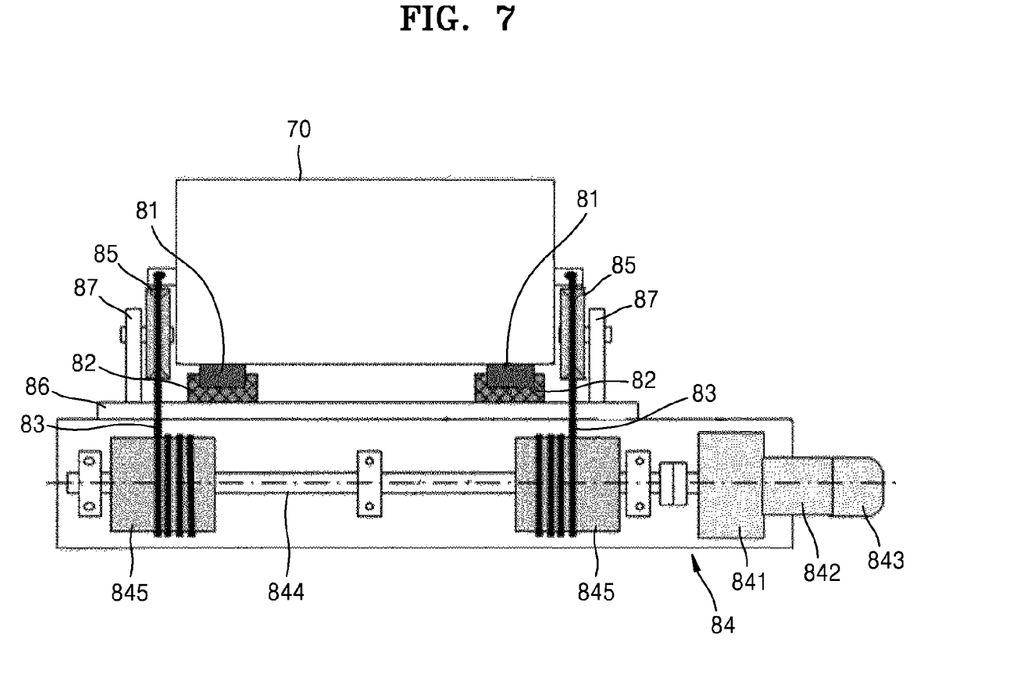
FIG. 7 is an extracted cross-sectional view of the key portion of FIG. 2.
Figure 8:
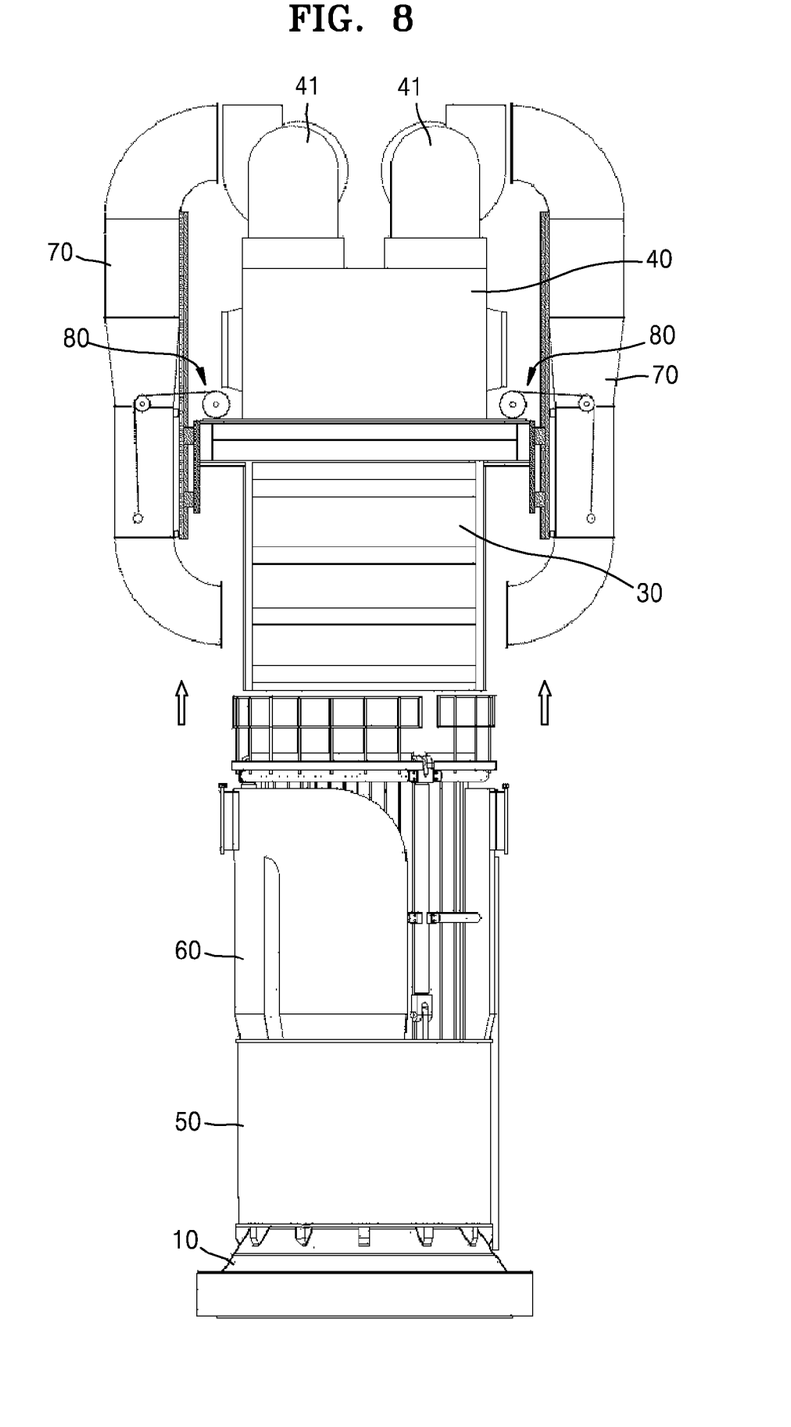
FIG. 8 is a schematic conceptual drawing showing a state when an upper duct is lifted by a head lift rig.
Figure 9:
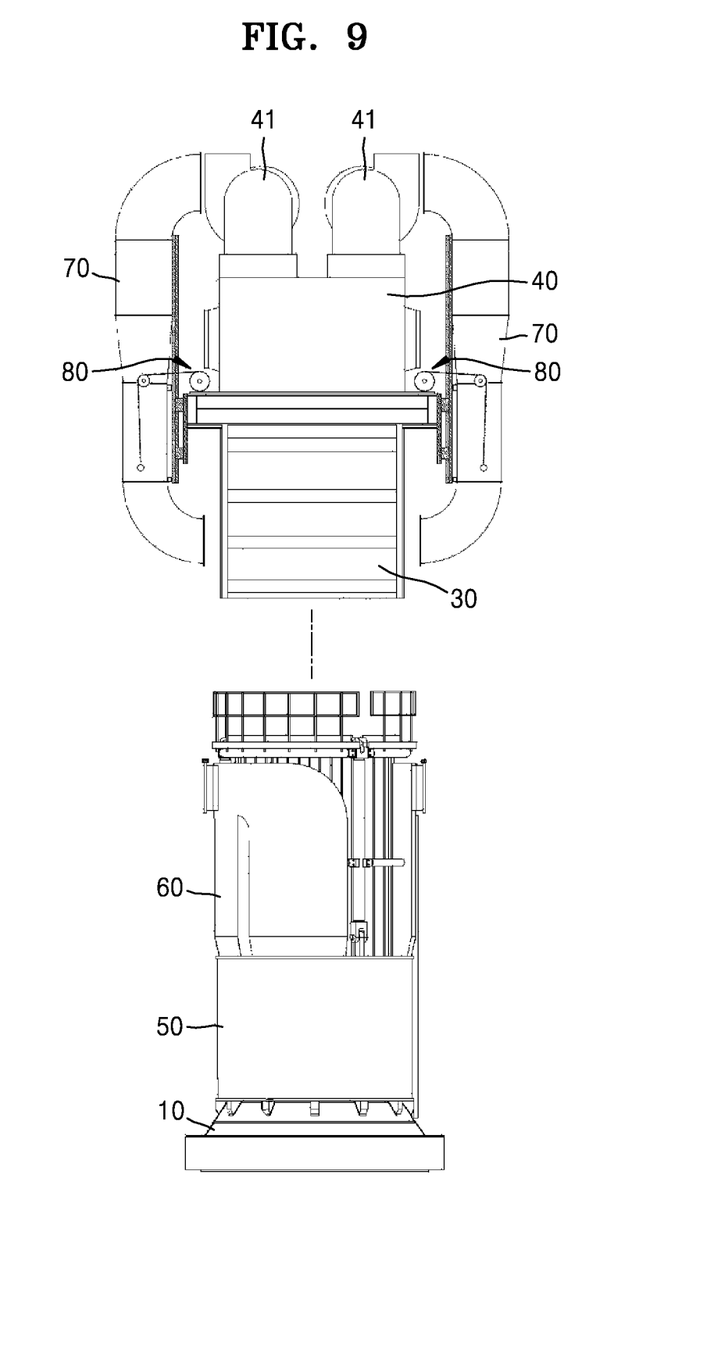
FIG. 9 is a schematic conceptual drawing showing a state when an upper duct and a lower duct are separated from each other.

FIG. 2 is a schematic conceptual drawing of an upper assembly of a nuclear reactor that employs a cooling duct assembly for a control element drive mechanism (CEDM), according to an embodiment of the present invention. FIG. 3 is an extracted perspective view of a key portion of the upper assembly of FIG. 2. FIGS. 4 and 5 are cross-sectional views of the key portion of FIG. 3. FIG. 6 is an extracted perspective view of the key portion of FIG. 2. FIG. 7 is an extracted cross-sectional view of the key portion of FIG. 2. FIG. 8 is a schematic conceptual drawing showing a state that an upper duct is lifted by a head lift rig. FIG. 9 is a schematic conceptual drawing showing a state that an upper duct and a lower duct are separated from each other.

Referring to FIG. 2, the cooling duct assembly for a CEDM according to an embodiment of the present invention includes a skirt 50, a lower duct 60, and an upper duct 70.

The cooling duct assembly for the CEDM is installed on an upper assembly of a nuclear reactor for cooling the CEDM 20. The upper assembly of the nuclear reactor denotes an assembly of a structure that is disposed on an upper side of a reactor head 10.

More specifically, the upper assembly of the nuclear reactor includes the CEDM 20 disposed above the reactor head 10, a cable tray 30 that is disposed above the control element drive mechanism 20, and a cooling air handling device 40 disposed above the cable tray 30. The cooling air handling device 40 includes a plurality of cooling fans 41.

Referring to FIGS. 3 and 5, the skirt 50 is coupled with a circumference of the reactor head 10, and first air channels 51 are formed in an inner side of the skirt 50. In FIG. 5, shaded regions correspond to the first air channels 51. The first air channels 51 are provided between an inner circumference of the skirt 50 and the CEDM 20.

The skirt 50 is a circular element that is combined with the upper part of the reactor head 10. Air around the reactor head 10 flows into the flow spaces S1, S2, S3, S4, and S5 formed in the lower duct 60 and cools the CEDM 20. After reaching an inner flow space of the skirt 50, the air flows upwards through the first air channels 51 provided on the inner circumference of the skirt 50.

The lower duct 60 is coupled with an upper part of the skirt 50. The lower duct 60 includes second air channels 61 that are connected to the first air channels 51. The lower duct 60 is disposed to surround a circumference of the CEDM 20. The upper part of the reactor head 10 and the CEDM 20 are surrounded by the lower duct 60 and the skirt 50.

FIG. 4 is a schematic cross-sectional view of the lower duct 60 after cutting along line IV-IV of FIG. 3. Referring to FIGS. 3 and 4, the lower duct 60 includes a plurality of sub-lower ducts having flow spaces for allowing the air around the reactor head 10 to flow towards the CEDM 20. The sub-lower ducts are separated from each other. The sub-lower ducts are disposed to surround the CEDM 20.

According to the current embodiment, the sub-lower ducts include a first sub-lower duct 62 and a second sub-lower duct 63. In the current embodiment, the first and second sub-lower ducts 62 and 63 are used. However, the lower duct 60 may include more than two sub-lower ducts.

The first sub-lower duct 62 is disposed above the skirt 50, and forms the flow space S5 for allowing the air around the reactor head 10 to flow towards the CEDM 20.

The second sub-lower duct 63, like the first sub-lower duct 62, is disposed above the skirt 50, and forms the flow spaces S3 and S4 for allowing the air around the reactor head 10 to flow towards the CEDM 20.

The first and second sub-lower ducts 62 and 63 are separated from each other. The flow spaces S1 and S2 that are formed by separating the first and second sub-lower ducts 62 and 63 from each other, like the flow spaces S3, S4, and S5, function as flow spaces for the air around the reactor head 10 to flow towards the CEDM 20.

Accordingly, according to the current embodiment, the lower duct 60 has a shape partly surrounding the circumference of the CEDM 20 while it is disposed above the skirt 50. The air around the reactor head 10 readily flows towards the CEDM 20 through the flow spaces S1 and S2 that are formed by separating the first and second sub-lower ducts 62 and 63 from each other, the flow space S5 formed in the first sub-lower duct 62, and the flow spaces S3 and S4 formed in the second sub-lower duct 63.

The upper duct 70 is provided for the cooling air that flows through second air channels 61 to be induced upwards. An edge of the upper duct 70 is coupled with the cooling air handling device 40, and the other edge thereof is detachably coupled with the lower duct 60.

In the current embodiment, an edge of the upper duct 70 is connected to the cooling air handling device 40 by a first connection flange 71, and the other edge thereof is connected to the lower duct 60 by a second connection flange 72.

According to the current embodiment, the skirt 50 and the lower duct 60 are disposed to surround the upper part of the reactor head 10 and the CEDM 20. The upper duct 70 is cascaded at an upper part of the lower duct 60 and is configured to upwardly extend from an outer side of the cable tray 30.

The upper duct 70 according to the current embodiment generally has a "⊓" shape, and two upper ducts 70 are provided on an outer side of the cable tray 30. Accordingly, unlike the related cooling duct assembly of FIG. 1, the cooling duct assembly for a CEDM of the current embodiment has a simplified structure.

Air that cools the CEDM 20 sequentially passes through the first air channels 51 of the skirt 50, the second air channels 61 of the lower duct 60, and the upper duct 70, and is discharged through the cooling air handling device 40 and the cooling fans 41.

In the cooling duct assembly for a CEDM according to the current embodiment, the upper duct 70 is separated from the lower duct 60, and the upper duct 70 is lifted together with the cooling air handling device 40.

More specifically, a lifting rig 80 is provided for lifting the upper duct 70.

The lifting rig 80 is provided for lifting the upper duct 70 when an edge of the upper duct 70 is separated from the cooling air handling device 40. The lifting rig 80 includes guide rail 81, guiding block 82, wire 83, winch 84, and pulley 85.

Referring to FIGS. 6 and 7, the guide rail 81 extends upwards and downwards and is combined with the outer circumference of the upper duct 70. In the current embodiment, two guide rails 81 facing each other extend in an upward and downward direction of the upper duct 70. However, the current embodiment is not limited thereto, that is, the lifting rig 80 may include more than two guiding rails 81.

The guiding block 82 is provided to support the guiding rail 81. The guiding block 82 is attached to the cable tray 30 or the cooling air handling device 40. As depicted in FIG. 2, according to the current embodiment, the guiding blocks 82 are coupled with the upper edges of the cable tray 30.

When the upper duct 70 is moved upwards by the lifting rig 80, if large enough clearances exists so that the guiding blocks 82 can be installed without any interference between the upper duct 70 and the upper edges of the cable tray 30, the guiding blocks 82 may be attached to an outer circumference of the cooling air handling device 40.

According to the current embodiment, the guiding block 82 is fixed on a fixing plate 86.

The fixing plate 86 is combined with the cable tray 30 or the cooling air handling device 40 to fixedly support the guiding block 82. The guiding block 82 is coupled with the fixing plate 86 and the guide rail 81 is guided by being inserted into the guiding block 82.

The Edge of the wire 83 is fixed on the lower edge of the upper duct 70. The other edge of the wire 83 is combined with wire drum 845 of the winch 84.

The winch 84 is provided to lift or descend the upper duct 70 by winding or unwinding the wire 83. According to the current embodiment, the winch 84 includes a reducer 841, a motor 842, and a brake 843.

The reducer 841 is provided for controlling a rotation speed of a driving axis 844 of the winch 84. The motor 842 provides power to rotate the driving axis 844. The brake 843 is provided to stop the rotation of the motor 842.

The lifting speed of the upper duct 70 may be appropriately selected by the reducer 841 in consideration of safety and work efficiency. The brake 843 may immediately stop the lifting of the upper duct 70 at any height.

The pulley 85 is provided to guide the wire 83 by being disposed between the winch 84 and an edge of the wire 83. According to the current embodiment, the pulley 85 is rotatably combined with supporting bracket 87 that is coupled with the fixing plate 86.

Hereinafter, operation of the cooling duct assembly for the CEDMs having the configuration described above, according to the current embodiment, will be described.

As depicted in FIG. 8, when the connection between the upper duct 70 and the first connection flange 71 of the cooling air handling device 40 is released, the second connection flange 72 that connects the upper duct 70 and the lower duct 60 is released.

The lifting operation of the upper duct 70 may be remotely controlled from a remote control room. In the remote control room, the motor 842 and the reducer 841 are operated by pressing a lifting button, and thus, the winch 84 is operated. The upper duct 70 is lifted upwards by the wires 83 that are wound on the wire drum 845 of the winch 84.

At this point, the lifting speed of the upper duct 70 may be controlled by the reduced 841, and thus, an appropriate lifting speed may be selected in consideration of safety and work efficiency.

Also, the lifting height of the upper duct 70 may be predetermined in consideration of the number of rotations of the wire drum 845. The operation of the winch 84 may be configured to control the winch 84 so that the winch 84 automatically stops when the upper duct 70 is lifted to a predetermined height.

Also, during a lifting of the upper duct 70, when the lifting operation cannot continue due to an emergency, the lifting of the upper duct 70 may be stopped by using the brake 843.

FIG. 9 shows an effect of the current embodiment. Referring to FIG. 9, an upper assembly of a nuclear reactor may be divided into an upper part that includes a cable tray 30, an upper duct 70, and a cooling air handling device 40, and a lower part that includes a reactor head 10, a skirt 50, a lower duct 60, and the CEDMs 20.

When refueling is needed in a nuclear reactor, the upper duct 70 is lifted by using a lifting rig 80 and the upper part of the upper assembly of the nuclear reactor is lifted as one body. The lower part of the upper assembly of the nuclear reactor may be lifted together with the reactor head 10 as one body.

After the refueling is completed, the upper assembly of the nuclear reactor is re-assembled in a reverse sequence of the above description. The lower part of the upper assembly of the nuclear reactor, that is, the reactor head 10, the skirt 50, the lower duct 60, and the CEDMs 20 are re-assembled in advance.

Next, the upper part of the upper assembly of the nuclear reactor, in which the upper duct 70 is in a lifted state, is moved to an upper side of the lower part of the upper assembly, and the upper part and the lower part of the upper assembly of the nuclear reactor are combined.

Next, the upper duct 70 is lowered by using the lifting rig 80, and is connected to the cooling air handling device 40 and the lower duct 60 by using the first and second connection flanges 71 and 72. In this way, re-assembling of the upper assembly of the nuclear reactor is completed.

As described above, the cooling duct assembly for CEDMs has a simplified duct assembly structure, and reduces workload and working time required for disassembling, moving, and storing constituent elements of the upper assembly of the nuclear reactor, thereby increasing the work efficiency due to the inclusion of the lifting rig 80 for lifting the upper duct 70, and also ensuring the safety of workers who work in a high radiation region by reducing the radiation exposure.

Also, as depicted in FIG. 9, the upper duct 70 is lifted by the lifting rig 80 so that a lower side of the upper duct 70 is positioned above a lower side of the cable tray 30. Thus, when the upper part of the upper assembly of the nuclear reactor that is lifted as one body is moved and temporarily stored, interferences with other structures may be minimized. Accordingly, the upper assembly of the nuclear reactor may be conveniently moved and stored.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cooling duct assembly for a control element drive mechanism that is installed on an upper assembly of a nuclear reactor that comprises a control element drive mechanism that is disposed above a reactor head; a cable tray disposed above the control element drive mechanism, and a cooling air handling device that is disposed above the cable tray, the cooling duct assembly comprising:
    a cylindrical skirt that is combined on a circumference of the reactor head and has first air channels in an inner side thereof;
    a lower duct that is combined with an upper side of the skirt, has second air channels connected to the first air channels, is disposed to surround a circumference of the control element drive mechanism, and has flow spaces for allowing air around the reactor head to flow towards the control element drive mechanism,
    an upper duct, one edge of which is combined with the cooling air handling device, and another edge of which is detachably combined with the lower duct; and
    a lifting rig that moves the upper duct up and down,
    wherein the lifting rig comprises a guide rail that extends in upper and lower directions of the upper duct and is combined with an outer surface of the upper duct, a guiding block that supports the guide rail by being attached to the cable tray or the cooling air handling device, a wire having an edge fixed on a lower edge of the upper duct, a winch that lifts and descends the upper duct by winding or unwinding the wire, and a pulley that is disposed between the edge of the wire and the winch to guide the wire,
    wherein air that cools the control element drive mechanism is discharged to the outside after sequentially passing through the first air channels of the skirt, the second air channels of the lower duct, the upper duct, and the cooling air handling device, and
    the upper duct separated from the lower duct is lifted together with the cooling air handling device, and the edge of the upper duct is detachably combined with the cooling air handling device.

2. The cooling duct assembly of claim 1, wherein the winch comprises:
    a reducer that controls a rotation speed of a driving axis;
    a motor that rotates the driving axis; and
    a brake that stops the motor from rotating.

3. The cooling duct assembly of claim 1, wherein the cable tray or the cooling air handling device further comprises a fixing plate that is combined with the guiding blocks, and the pulley is rotatably combined with supporting bracket that is combined with the fixing plate.

4. The cooling duct assembly of claim 1, wherein the lower duct comprises a plurality of sub-lower ducts having flow spaces for inducing air around the reactor head towards the control element drive mechanism, wherein the sub-lower ducts are separated from each other.

5. The cooling duct assembly of claim 4, wherein the sub-lower ducts comprise a first sub-lower duct having a flow space for inducing the air around the reactor head towards the control element drive mechanism and a second sub-lower duct having flow spaces for inducing the air around the reactor head towards the control element drive mechanism.

* * * * *